(12) United States Patent
Parenti et al.

(10) Patent No.: US 11,797,019 B2
(45) Date of Patent: Oct. 24, 2023

(54) RUGGED TERRAIN VEHICLE DESIGN AND ROUTE OPTIMIZATION

(71) Applicant: Ford Global Technologies, LLC, Dearborn, MI (US)

(72) Inventors: Robert Parenti, Dearborn, MI (US); Cynthia Neubecker, Westland, MI (US); Adil Nizam Siddiqui, Farmington Hills, MI (US)

(73) Assignee: Ford Global Technologies, LLC

( * ) Notice: Subject to any disclaimer, the term of this patent is extended or adjusted under 35 U.S.C. 154(b) by 172 days.

(21) Appl. No.: 16/933,109

(22) Filed: Jul. 20, 2020

(65) Prior Publication Data

US 2022/0019233 A1    Jan. 20, 2022

(51) Int. Cl.
*G05D 1/00* (2006.01)
*G05D 1/02* (2020.01)
(Continued)

(52) U.S. Cl.
CPC ......... *G05D 1/0246* (2013.01); *G05D 1/0088* (2013.01); *G05D 1/0214* (2013.01);
(Continued)

(58) Field of Classification Search
CPC .. G05D 1/0246; G05D 1/0088; G05D 1/0214; G05D 1/0217; G05D 1/0295;
(Continued)

(56) References Cited

U.S. PATENT DOCUMENTS 9,977,431 B2    5/2018 Lockwood et al.
2010/0057358 A1*  3/2010 Winer ................ G01C 21/3667
                                                 701/414

(Continued)

FOREIGN PATENT DOCUMENTS

CN    209920960    *  5/2019
CN    2099220960   *  5/2019

(Continued)

OTHER PUBLICATIONS

CN-2099220960 Translation (Year: 2019).*

(Continued)

*Primary Examiner* — Rachid Bendidi
*Assistant Examiner* — Ibrahim Abdoalatif Alsomairy
(74) *Attorney, Agent, or Firm* — Brandon Hicks; Eversheds Sutherland (US) LLP (57) ABSTRACT

Method and system for providing a mobility service is described. The mobility service can include delivering goods in rough terrain, rural areas, and other similar environments, by selecting and configuring vehicles for terrain considerations based on known and dynamically changing information. The disclosed system can include a vehicle configured with a deployable autonomous drone, and can determine optimized vehicle routes to remote locations using the deployable drone and vehicle navigation sensors, for real time mapping that can be combined with existing map/terrain data. The terrain data may also be sent to a vehicle in a vehicle fleet, and/or to a cloud-based server, and be used to compute the best available vehicles designed for the mobility service. The system may deploy one or more mobility solutions, collect telematics, road information, navigational data, and other information during the delivery. This feedback may then be used for future mobility services.

17 Claims, 6 Drawing Sheets

(51) Int. Cl.
  *G06V 20/10* (2022.01)
  *B64C 39/02* (2023.01)
(52) U.S. Cl.
  CPC ......... *G05D 1/0217* (2013.01); *G05D 1/0295* (2013.01); *G06V 20/182* (2022.01); *G06V 20/188* (2022.01); *B64C 39/024* (2013.01); *G05D 2201/0207* (2013.01)
(58) Field of Classification Search
  CPC ......... G05D 2201/0207; G06V 20/182; G06V 20/188; B64C 39/024; B64C 2201/027; B64C 2201/123; B64C 2201/127; B64C 2201/145; G08G 1/202; G01C 21/3423
  See application file for complete search history.

(56) References Cited

U.S. PATENT DOCUMENTS

| | | | | |
|---|---|---|---|---|
| 2013/0046526 A1* | 2/2013 | Yucel | ................ | G01C 21/3469 703/8 |
| 2014/0257621 A1* | 9/2014 | Zych | ..................... | G01C 21/20 701/410 |
| 2017/0227968 A1* | 8/2017 | Klinger | .................... | H01Q 3/26 |
| 2018/0107211 A1* | 4/2018 | Schubert | ............. | G08G 5/0026 |
| 2018/0321693 A1* | 11/2018 | Tu | ............................ | G05D 1/12 |
| 2019/0025820 A1* | 1/2019 | Ferguson | ............. | G08G 1/0112 |

FOREIGN PATENT DOCUMENTS

| | | |
|---|---|---|
| DE | 102011106170 A1 | 2/2012 |
| EP | 3273201 A1 | 1/2018 |
| JP | 2010237980 A * | 10/2010 |
| JP | 2016138853 A * | 8/2016 |
| WO | 2017157863 A1 | 9/2017 |
| WO | 2018007330 A1 | 1/2018 |

OTHER PUBLICATIONS

JP-2010237980-A Translation (Year: 2010).*
JP-2016138853-A Translation (Year: 2016).*
CN-209920960 Translation (Year: 2019).*
"Urban Mobility: Getting Around Stress-Free," Kathrin Wildemann, Dec. 7, 2017; Web page <https://www.zf.com/mobile/en/stories_3139.html>, 6 pages, retrieved from the internet on Oct. 19, 2020.

* cited by examiner

RUGGED TERRAIN VEHICLE DESIGN AND ROUTE OPTIMIZATION

TECHNICAL FIELD

The present disclosure relates to vehicle configuration systems, and more particularly, to a rugged terrain vehicle design and route optimization system.

BACKGROUND

Determining the best route for vehicles to perform a mobility task such as delivering goods or passengers at a target destination in the wilderness may not be a simple task when the destination requires traversing rugged terrain with poor roads or no roads at all. Although online navigation tools may be functional for navigating an urban terrain, conventional navigation methods may not provide adequate information for navigation of remote areas with rough terrain and without well-traveled roads. Remote delivery and mobility may be further challenged due to the proliferation of autonomous vehicles (AVs) and systems. Some AVs are currently designed to use online navigation services, may include their own suite of sensors, and may be further enabled via vehicle-to-vehicle communication networks to aid in autonomous navigation. However, conventional navigation scenarios may rely on updates from other devices or vehicles to optimize routes. When there are few other vehicles nearby, an AV may not receive needed navigational information.

According to the World Bank organization, 31% of the world's rural population (98% of them in developing countries) do not live within 1 mile of an all-season road. The need to provide last mile mobility in rugged terrain will therefore continue to increase with worldwide population trends, where more than 1 billion residents of rural and remote areas will likely require increased road availability for access to goods and services.

A method for determining a difficulty rating associated with an off-road terrain is disclosed in World Intellectual Property Organization (WIPO) Patent Pub. No. 2018007330 A1 (hereafter "the '330 publication"), assigned to Jaguar Land Rover Ltd.

The system described in the '330 publication assigns a difficulty rating based on data collected while a vehicle traverses the terrain, and can be related to off-roading capabilities of the vehicle. However, conventional systems such as the system described in the '330 publication do not use data from the environment observed during past delivery trips nor real-time data from other vehicles in a fleet to improve the route selection and vehicle optimization for rough terrains, and to configure total delivery solutions that can include selection of available fleet vehicles that have different off-road capabilities, drone assignments, payload capacities, fuel capacities and types, etc. This can be important when roads or terrain have been rarely or never traveled, and when available fleet vehicles, payload, passengers, and other considerations are dynamically changing.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed to a system for optimizing last-mile delivery solutions using a vehicle that operates as part of a fleet of vehicles in rough terrain, rural areas, and other similar environments, by selecting and configuring vehicles for environmental information that can include terrain considerations based on known and dynamically changing information. The system may obtain geographic and terrain data using drones and vehicle navigation sensors, for real time mapping in combination with existing map/terrain data. The terrain data can include route-specific information that identifies navigable travel paths to the target destination, and identifies and characterizes obstacles and on-road and off-road conditions, among other information. Using the terrain data, the system selects the vehicle routes through the challenging terrain, and provides systematic feedback for improving the legacy maps and terrain information over time.

The system may optimize rural routing for a vehicle using a drone deployed from the vehicle, other sensors onboard the vehicle, and information received from other vehicles in a fleet, for real time mapping. The system may also combine the real-time mapping information with existing map/terrain data, and include terrain information that describes obstacles, road conditions, alternate off-road routes, and various other characteristics for providing the last-mile delivery of goods to the target location for continuous systematic improvement and geographical accuracy. The mobility navigation module is configured to evaluate the terrain data, payload information, time considerations, and available fleet vehicles to determine a vehicle configuration best suited for a respective delivery and target destination.

In one example embodiment, the present disclosure, a method for performing a mobility service using a first vehicle, can include collecting terrain data using a vehicle sensor and an autonomous drone while the vehicle is deployed in the field to perform a mobility service. The mobility navigation system may receive the environmental information at a mobility navigation module, which may be instantiated onboard the vehicle or in a cloud-based server in wireless communication with the vehicle. The mobility navigation module may select a vehicle for performing the mobility service based on the terrain data, which may include characteristics of the terrain such as road surface information, route information, road conditions, etc., and a vehicle characteristic associated with the terrain data, and perform the mobility service using the selected vehicle based, at least in part, on the terrain data.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 1:
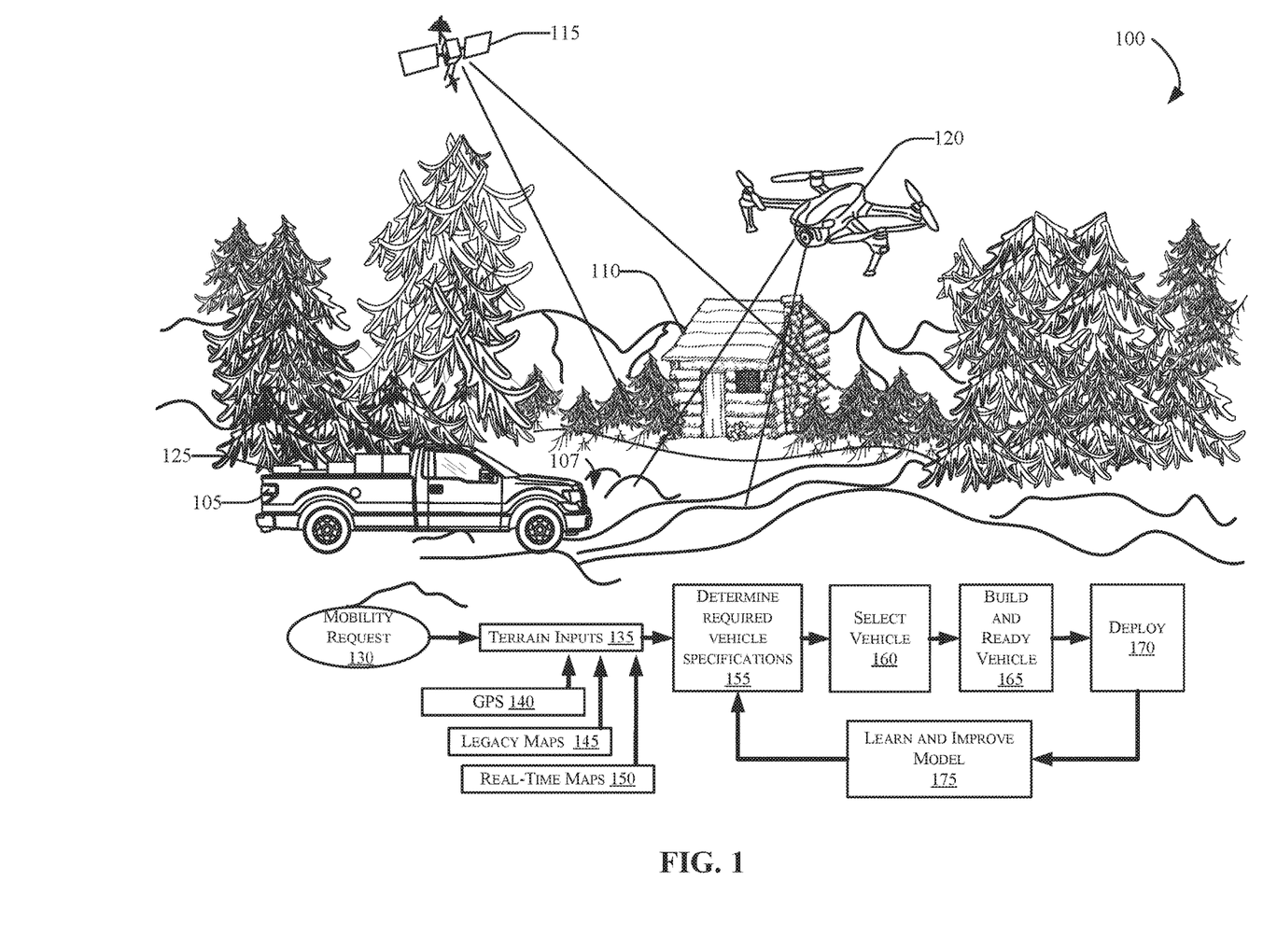
FIG. 1 depicts an example operating environment in which techniques and structures for providing the systems and methods disclosed herein may be implemented.

FIG. 1 depicts an example operating environment 100 and flow diagram in which techniques and apparatuses for providing the systems and methods disclosed herein may be implemented. A vehicle 105 is depicted operating on rough terrain as it carries goods 125 to a target destination 110. The vehicle 105 may include a mobility navigation system 107, operate as one of a fleet of vehicles that can employ different modalities of travel, and include various types of on-road and off-road capabilities, cargo capacities, etc. Stated in another way, different modalities of travel can drive different mobility solutions deployed based on terrain characteristics. In this example scenario depicted in FIG. 1, the target destination 110 may be located in a remote location with or without roads, and may be generally isolated from urban or suburban populations where delivery of goods and services is common.

The flow diagram of FIG. 1 begins with receipt of a mobility request 130, which may include a request for delivery of the goods 125. In other example embodiments, the mobility request 130 may include delivery of passengers or services administrated by human and non-human assets. The vehicle 105 may be an autonomous vehicle or a human-operated vehicle operating with Global Positioning Service (GPS) coordinates received via a GPS satellite network 115. GPS satellite networks may not be particularly helpful in situations where map data and environmental information are insufficient. For example, although the vehicle 105 may know, geographically, where the delivery destination is (the target destination 110) the optimal route to the destination depends on secondary information obtainable using publicly accessible map services, or obtainable from one or more other sources. Environmental information may include terrain data, weather and atmospheric conditions, population information, road density information, availability of refueling/recharging stations along a path to the target destination, road condition information such as observed or reported road damage, and other such information that may affect an ability for a particular vehicle to perform the mobility service.

The mobility navigation system 107 may include one or more autonomous drones 120 that may be deployable from the vehicle 105 to explore the path ahead of the vehicle 105 to evaluate road conditions, generate map information, identify and characterize obstacles that may intervene with the vehicle 105 and the target destination 110, and provide other information such as real-time atmospheric conditions, or identification of other travelers and vehicles that may introduce challenges to the delivery of the goods 125. The mobility navigation system 107 may receive terrain inputs 135 that can include GPS information 140, map information from legacy maps 145 that may be publicly available online and offline, and real-time map information 150 generated, at least in part, by the autonomous drone 120, and/or by other vehicles that may share such information using a vehicle-to-vehicle communication network, such as other vehicles in the fleet (fleet not shown in FIG. 1).

In some aspects, the mobility navigation system 107 may determine vehicle specifications at step 155 based on the terrain inputs 135. The vehicle specifications may include information that can be useful in performing the present delivery of the goods 125, such as engaging the drivetrain axels for 4-wheel drive functionality, reducing air pressure in the tires such that traction on rocks and other obstacles is increased, or performing other real-time vehicle configurations responsive to the received inputs.

In other aspects, the mobility navigation system may also obtain information for self-improvement of the mobility navigation system 107, including development of the map and terrain data associated with particular destinations for use in future deliveries. When the next mobility request is received by the mobility navigation system 107, the system may select an appropriate vehicle at step 160 given the terrain inputs 135, and based on the determined vehicle specifications, at step 155. Building and readying the vehicle(s) 165 may include configuring the vehicles to navigate the terrain associated with the target destination 110. Finally, the mobility navigation system 107 may deploy the vehicle at step 170, as shown in FIG. 1, to perform the mobility services such as delivery of goods, transportation of people, equipment, medical supplies, and other services. As subsequent deliveries or other services are performed, the mobility navigation system 107 may continually self-improve, as shown in block 175, by receiving updated map and obstacle information from the vehicle 105 and/or the autonomous drone 120, receiving telematics information from other members of the vehicle fleet performing respective services associated with the same geographic area, and evaluating the information to identify strengths and also areas for improvement with respect to the suitability of particular vehicles for a given task.

Figure 2:
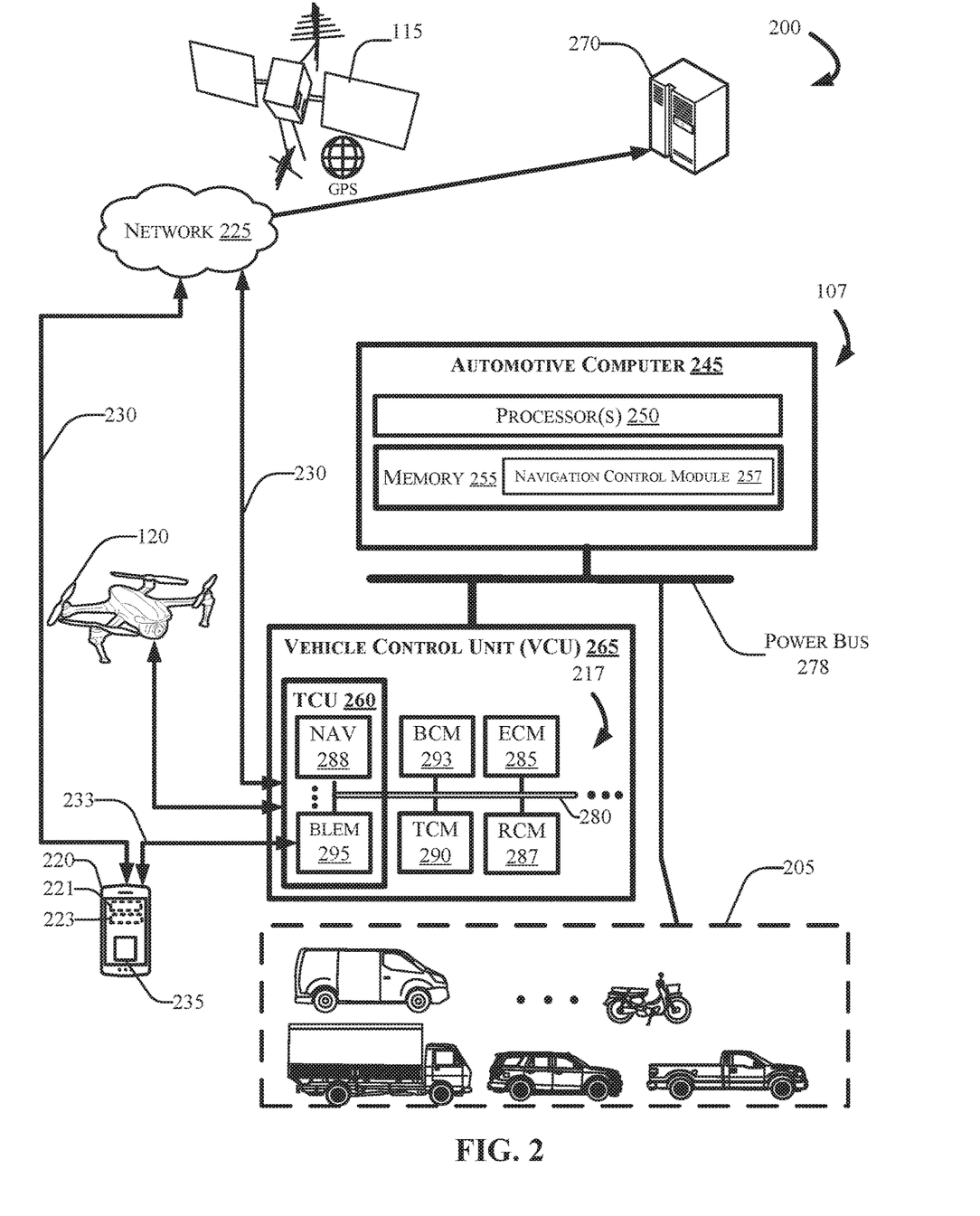
FIG. 2 depicts an example computing environment in which techniques and structures for providing the systems and methods disclosed herein may be implemented.

FIG. 2 depicts an example computing environment 200 that can include a vehicle 205 comprising an automotive computer 245, and a Vehicle Controls Unit (VCU) 265 that typically includes a plurality of electronic control units (ECUs) 217 disposed in communication with the automotive computer 245 and a mobility navigation system 107. The vehicle 205 may be substantially similar or identical to the vehicle 105 depicted with respect to FIG. 1. A mobile device 220, which may be associated with a user (not shown in FIG. 2) and the vehicle 205, may connect with the automotive computer 245 using wired and/or wireless communication protocols and transceivers. The mobile device 220 may be communicatively coupled with the vehicle 205 via one or more network(s) 225, which may communicate via one or more wireless channel(s) 230, and/or may connect with the vehicle 205 directly using near field communication (NFC) protocols, Bluetooth® protocols, and Wi-Fi, Ultra-Wide Band (UWB), and other possible data connection and sharing techniques. The vehicle 205 may also receive and/or be in communication with a Global Positioning System (GPS) satellite network 115.

The automotive computer 245 may be or include an electronic vehicle controller, having one or more processor(s) 250 and memory 255. The automotive computer 245 may, in some example embodiments, be disposed in communication with the mobile device 220, and one or more server(s) 270. The server(s) 270 may be part of a cloud-based computing infrastructure, and may be associated with and/or include a Telematics Service Delivery Network (SDN) that provides digital data services to the vehicle 205 and other vehicles (not shown in FIG. 2) that may be part of a vehicle fleet.

The vehicle 205 may take the form of a passenger or commercial automobile such as, for example, a car, a truck, a sport utility, a crossover vehicle, a van, a minivan, a taxi, a bus, a motorcycle, a cargo truck, and/or the like, and may be configured to include various types of automotive drive systems. The vehicle 205 may also take the form of a drone, a motorized bike, a motorcycle, or some other configuration of vehicle, an aerial delivery vehicle, a delivery drone, and/or an amphibious vehicle, and may include any sort of drive system known in the art.

Exemplary drive systems can include internal combustion engine (ICE) powertrains having a gasoline, diesel, or natural gas-powered combustion engine with conventional drive components such as, a transmission, a drive shaft, a differential, etc. In another configuration, the vehicle 205 may be configured as an electric vehicle (EV). More particularly, the vehicle 205 may include a battery EV (BEV) drive system, or be configured as a hybrid EV (HEV) having an independent onboard powerplant, a plug-in HEV (PHEV) that includes a HEV powertrain connectable to an external power source, and including a parallel or series hybrid powertrain having a combustion engine powerplant and one or more EV drive systems. HEVs can include battery and/or supercapacitor banks for power storage, flywheel power storage systems, or other power generation and storage infrastructure. The vehicle 205 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 205 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level 5 autonomy is associated with autonomous vehicle systems that require no human input for operation, and generally do not include human operational driving controls.

According to embodiments of the present disclosure, the mobility navigation system 107 may be configured to operate with a vehicle having a Level-1 through Level-5 autonomous vehicle controller. An example AV controller 300 is described in greater detail with respect to FIG. 3. Accordingly, the mobility navigation system 107 may provide some aspects of human control to the vehicle 205, when the vehicle is configured as an AV.

The mobile device 220 generally includes a memory 223 for storing program instructions associated with an application 235 that, when executed by a mobile device processor 221, performs aspects of the disclosed embodiments. The application (or "app") 235 may be part of, provide information to, and/or receive information from the mobility navigation system 107. For example, a user (not shown in FIG. 2) may operate the application 235 to deploy the autonomous drone 120, view map information, select vehicle configuration settings, receive update information regarding target destinations, etc.

In some aspects, the mobile device 220 may communicate with the vehicle 205 through the one or more channel(s) 230, which may be encrypted and established between the mobile device 220 and a Telematics Control Unit (TCU) 260. The mobile device 220 may communicate with the TCU 260 using a wireless transmitter (not shown in FIG. 2) associated with the TCU 260 on the vehicle 205. The transmitter may communicate with the mobile device 220 using a wireless communication network such as, for example, the one or more network(s) 225. The wireless channel(s) 230 are depicted in FIG. 1 as communicating via the one or more network(s) 225, and via one or more direct connection(s) 233. The connection(s) 233 may include various low-energy protocols including, for example, Bluetooth®, BLE, or other Near Field Communication (NFC) protocols.

The network(s) 225 illustrate an example communication infrastructure in which the connected devices discussed in various embodiments of this disclosure may communicate. The network(s) 225 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 245 may be installed in an engine compartment of the vehicle 205 (or elsewhere in the vehicle 205) and operate as a functional part of the mobility navigation system 107, in accordance with the disclosure. The automotive computer 245 may include one or more processor(s) 250 and a computer-readable memory 255.

The one or more processor(s) 250 may be disposed in communication with one or more memory devices disposed in communication with the respective computing systems (e.g., the memory 255 and/or one or more external databases not shown in FIG. 2). The processor(s) 250 may utilize the memory 255 to store programs in code and/or to store data for performing aspects in accordance with the disclosure. The memory 255 may be a non-transitory computer-readable memory. The memory 255 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The memory 255 may store program instructions for performing substantial portions of the disclosed method and system, including, for example, a navigation module 257. For example, the navigation control module 257 may configure the processor to receive the environmental data, which may include characteristics of terrain associated with providing the mobility service (e.g., terrain data) and select a vehicle for performing the mobility service based on the terrain data and a vehicle characteristic associated with the environmental data. The navigation control module 257 may further configure the processor 250 to perform the mobility service using the vehicle based on the terrain data, and other information.

The VCU 265 may share a power bus 280, and may be configured to coordinate the data between vehicle 205 systems, the autonomous drone 120, connected servers (e.g., the server(s) 270), and other vehicles (not shown in FIG. 2) operating as part of a vehicle fleet. The VCU 265 can include or communicate with any combination of the ECUs 217, such as, for example, a Body Control Module (BCM) 293, an Engine Control Module (ECM) 285, a Transmission Control Module (TCM) 290, the TCU 260, a Restraint Control Module (RCM) 287, etc. In some aspects, the VCU 265 may control aspects of the vehicle 205, and implement one or more instruction sets received from the application 235 operating on the mobile device 220, from one or more instruction sets received from the mobility navigation system 107, and/or from instructions received from an AV controller, such as an AV controller discussed with respect to FIG. 2. The navigation control module 257 may instruct the processor(s) 250 to perform steps such as collecting environmental information using vehicle sensors, and using the autonomous drone 120, receiving the environmental information, and storing the data to the memory 255, and selecting other vehicles in the fleet for performing the mobility services. For example, the navigation control module 257 may store instructions that cause the processor(s) 250 to select the vehicle to deliver a package based on the environmental information and vehicle characteristics associated with the environmental information, and perform the mobility service.

The TCU 260 can be configured to provide vehicle connectivity to wireless computing systems onboard and offboard the vehicle 205, and may include a Navigation (NAV) receiver 288 for receiving and processing a GPS signal from the GPS satellite network 115, a Bluetooth® Low-Energy (BLE) Module (BLEM) 295, a Wi-Fi transceiver, an Ultra-Wide Band (UWB) transceiver, and/or other wireless transceivers (not shown in FIG. 2) that may be configurable for wireless communication between the vehicle 205 and other systems, computers, and modules. The TCU 260 may be disposed in communication with the ECUs 217 by way of a bus 280. In some aspects, the TCU 260 may retrieve data and send data as a node in a CAN bus.

The BLEM 295 may establish wireless communication using Bluetooth and Bluetooth Low-Energy® communication protocols by broadcasting and/or listening for broadcasts of small advertising packets, and establishing connections with responsive devices that are configured according to embodiments described herein. For example, the BLEM 295 may include Generic Attribute Profile (GATT) device connectivity for client devices that respond to or initiate GATT commands and requests, and connect directly with the mobile device 220.

The bus 280 may be configured as a Controller Area Network (CAN) bus organized with a multi-master serial bus standard for connecting two or more of the ECUs 217 as nodes using a message-based protocol that can be configured and/or programmed to allow the ECUs 217 to communicate with each other. The bus 280 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 217 may communicate with a host computer (e.g., the automotive computer 245, the mobility navigation system 107, and/or the server(s) 270, etc.), and may also communicate with one another without the necessity of a host computer. The bus 280 may connect the ECUs 217 with the automotive computer 245 such that the automotive computer 245 may retrieve information from, send information to, and otherwise interact with the ECUs 217 to perform steps described according to embodiments of the present disclosure. The bus 280 may connect CAN bus nodes (e.g., the ECUs 217) to each other through a two-wire bus, which may be a twisted pair having a nominal characteristic impedance. The bus 280 may also be accomplished using other communication protocol solutions, such as Media Oriented Systems Transport (MOST) or Ethernet. In other aspects, the bus 280 may be a wireless intra-vehicle CAN bus.

The VCU 265 may control various loads directly via the bus 280 communication or implement such control in conjunction with the BCM 293. The ECUs 217 described with respect to the VCU 265 are provided for exemplary purposes only, and are not intended to be limiting or exclusive. Control and/or communication with other control modules not shown in FIG. 2 is possible, and such control is contemplated.

In an example embodiment, the ECUs 217 may control aspects of vehicle operation and communication using inputs from human drivers, inputs from an autonomous vehicle controller, the mobility navigation system 107, and/or via wireless signal inputs received via the wireless channel(s) 233 from other connected devices such as the mobile device 220, among others. The ECUs 217, when configured as nodes in the bus 280, may each include a central processing unit (CPU), a CAN controller, and/or a transceiver (not shown in FIG. 2). For example, although the mobile device 220 is depicted in FIG. 2 as connecting to the vehicle 205 via the BLEM 295, it is possible and contemplated that the wireless connection 233 may also or alternatively be established between the mobile device 220 and one or more of the ECUs 217 via the respective transceiver(s) associated with the module(s).

The BCM 293 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 293 may also operate as a gateway for bus and network interfaces to interact with remote ECUs (not shown in FIG. 2).

The BCM 293 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 293 may be configured for vehicle energy management, exterior lighting control, wiper functionality, power window and door functionality, heating ventilation and air conditioning systems, and driver integration systems. In other aspects, the BCM 293 may control auxiliary equipment functionality, and/or be responsible for integration of such functionality.

The computing system architecture of the automotive computer 245, VCU 265, and/or the mobility navigation system 107 may omit certain computing modules. It should be readily understood that the computing environment depicted in FIG. 2 is one example of a possible implementation according to the present disclosure, and thus, it should not be considered limiting or exclusive.

Figure 3:
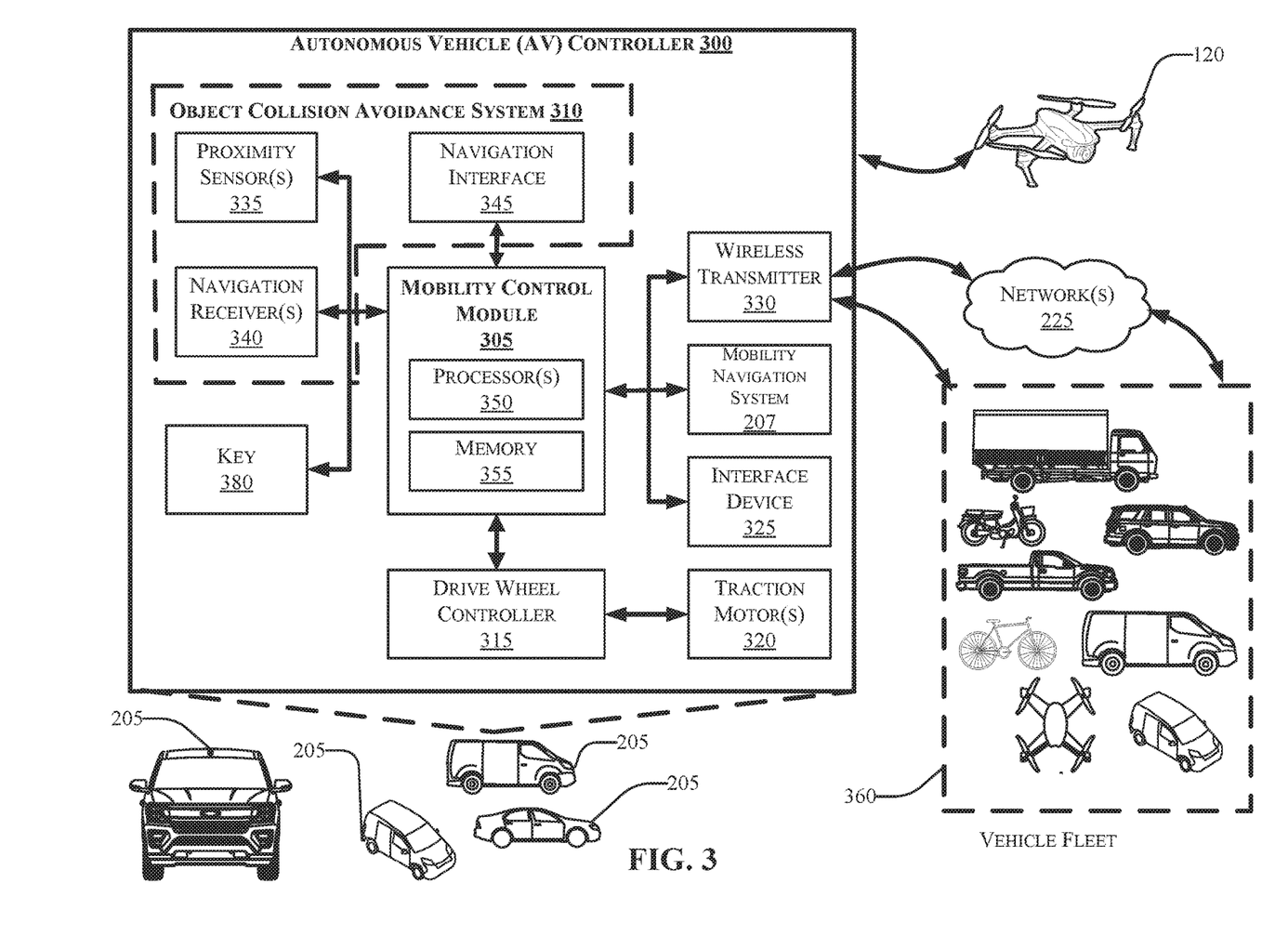
FIG. 3 depicts a block diagram of an example control system for an autonomous vehicle in accordance with the present disclosure.

FIG. 3 depicts a block diagram of an example control system 300 for an autonomous vehicle such as, for example, the vehicles 105, 205 depicted in FIGS. 1 and 2. The example navigation system 107 may include a mobility control module 305, which may be configured to receive data from an object collision avoidance system 310. The control system 300 may further include a drive wheel controller 315 in communication with the mobility control module 305 and one or more traction motor(s) 320 in communication with the drive wheel controller 315. An interface device 325 may be in communication with the object collision avoidance system 310. The object collision avoidance system 310 may communicate one or more control signals to the mobile device application 235 via the VCU 265 (as shown in FIG. 2), which may be in communication with the mobility control module 305.

The object collision avoidance system 310 may include one or more proximity sensor(s) 335, one or more navigation receiver(s) 340, and a navigation interface 345 through which users of the vehicles 205 may interact with the mobility navigation system. The mobility control module 305 may communicate with the drive wheel controller 315 and transmit one or more signals for control of the one or more traction motor(s) 320. In an example embodiment, the mobility control module 305 may further include the key 380, which may be configured to activate an operation of the vehicle(s) 205. The key may be a physical key or an identification code or a password entered by a user via a touch screen interface (e.g., the interface device 325).

The control system 300 may further include the network(s) 225 configured to communicate with one or more other vehicles in a fleet 360 of autonomous, semi-autonomous, and/or conventional vehicles, two wheel cycles and/or drones in various ways, including via an indirect communication channel (not shown in FIG. 3) through the network(s) 225, and/or via one or more direct communication channel(s) (not shown in FIG. 3).

The mobility control module 305 may include one or more processor(s) 350, and a memory 355. The processor(s) 350 may be one or more commercially available general-purpose processor(s), such as a processor from the Intel® or ARM® architecture families. In some aspects, the mobility control module 305 may be implemented in a system on a chip (SoC) configuration, to include other system components such as RAM, flash storage and I/O buses. Alternatively, mobility control module 305 can be implemented using purpose-built integrated circuits, or any other suitable technology now known or later developed. The mobility control module 305 also includes a memory unit (not shown in FIG. 3).

The memory 355 may include executable instructions implementing the basic functionality of the navigation system 107 and a database of locations within a given geographic area.

The object collision avoidance system 310 may provide route management and communication between one or more other vehicles in the swarm (or fleet), and to the operator of the vehicle if the vehicle 205 is a human operated vehicle. The object collision avoidance system 310 may receive operator input via the navigation interface 345 to receive user selections indicative of approval or selection of vehicle configuration options such as, for example, an adjustable tire pressure for navigating rocky terrain, and vehicle characteristics associated with the vehicle's relative ability to navigate particular weather or road conditions the vehicle(s) may encounter en route to a given destination. The mobility control module 305 may receive navigational data from the navigation receiver(s) 340 and the proximity sensor(s) 335, determine a navigational path from a first location to a second location, and provide instructions to the drive wheel controller 315 for autonomous, semi-autonomous, and/or manual operation.

The navigation receiver(s) 340 can include one or more of a global positioning system (GPS) receiver as shown in FIG. 2, and/or other related satellite navigation systems such as the global navigation satellite system (GLNSS), Galileo, or other similar systems known in the art of autonomous vehicle operation. Additionally, the navigation receiver(s) 340 can be configured to receive locally based navigation cues to aid in precise navigation through space-restricted areas, such as, for example, in a congested street, and/or in a distributed beacon environment. When deployed in conjunction with a distributed beacon network (not shown in FIG. 3), locally based navigation cues can include communication with one or more purpose-built location beacons (not shown in FIG. 3) placed throughout a geographic area. The navigation cues may enable an increased level of navigation precision and provide specific indicators for locations of various points of interest. In other aspects, the navigation receiver(s) 340 may include one or more navigation transceivers (not shown in FIG. 3) for communication with mobile network infrastructure for cell tower triangulation and use of known-location Wi-Fi hotspots. Any location technology now known or later developed that can provide a high precision location (e.g. preferably within a square foot) can be useful as a component of the navigation receiver(s) 340. The navigation receiver(s) 340 may be further configured to receive locally based navigation cues from the autonomous drone 120, and/or other vehicles in the vehicle fleet 360.

The proximity sensor(s) 335 may work in connection with the navigation receiver(s) 340 to provide situational awareness to the mobility control module 305 for autonomous navigation. For example, the proximity sensors 335 may include one or more Radio Detection and Ranging (RADAR or "radar") sensor(s) configured for detection and localization of objects using radio waves, a Light Detecting and Ranging (LiDAR or "lidar") sensor, a vision sensor system having trajectory, obstacle detection, object classification, augmented reality, and/or other capabilities, and/or the like. The proximity sensor(s) 335 may alert the mobility control module 305 to the presence of sensed obstacles, and provide trajectory information to the mobility control module 305, where the trajectory information is indicative of moving objects or people that may interact with the vehicle(s) 205. The trajectory information may include one or more of a relative distance, a trajectory, a speed, a size approximation, a weight approximation, and/or other information that may indicate physical characteristics of a physical object or person. The mobility control module 305 may be configured to aggregate information from the navigation receiver(s)

340, such as current position and speed, along with sensed obstacles from the proximity sensor(s) 335, and interpret the aggregated information to compute a safe path towards a destination such that the vehicle 205 avoids collisions. Sensed obstacles can include other vehicles, pedestrians, animals, structures, curbs, and other random objects. In some implementations the proximity sensor(s) 335 may be configured to determine the lateral dimensions of the path upon which the vehicle 205 is traveling, e.g. determining relative distance from the edge of a sidewalk or curb, to help aid mobility control module 305 in maintaining precise navigation on a particular navigable path.

The navigation interface 345 allows the operator of the vehicle 205 to interact with the vehicle 205 by providing inputs and receiving information from the computing systems of the vehicle.

The interface device 325 may include a touch screen interface surface configured to providing operational information such as power consumption information, battery health, battery level, etc. The mobility navigation system 207 can be responsible for controlling other aspects of the vehicle 205, such as breaking, acceleration, etc., which may be in communication with the navigation interface 345, and/or be integral with the navigation interface 345 such that they share a common touch screen interface.

The wireless transmitter 330 may communicate with one or more other vehicles in the vehicle fleet 360 and/or a central routing computer (e.g., the server(s) 270 as shown in FIG. 2) using a wireless communication network such as, for example, the network(s) 225. The network(s) 225 may be the Internet, a private network, a cellular telephone provider's data network, or other network infrastructure. The wireless transmitter 330 may embody any known or later technology, using one or more vehicle-to-vehicle communication protocols. An example of a vehicle-to-vehicle communication protocol may be, for example, the dedicated short-range communication (DSRC) protocol.

The mobility control module 305 may connect with one or more drive wheel controller(s) 315, which in turn may operate one or more traction motors 320. The mobility control module 305 may communicate with the drive wheel controller(s) 315 for providing autonomous and/or semi-autonomous navigation to selected geographic points of interest.

The drive wheel controller 315 may control one or more vehicle drive mechanisms such as, for example, one or more brushless direct current (DC) motor(s), or another traction motor technology.

Figure 4:
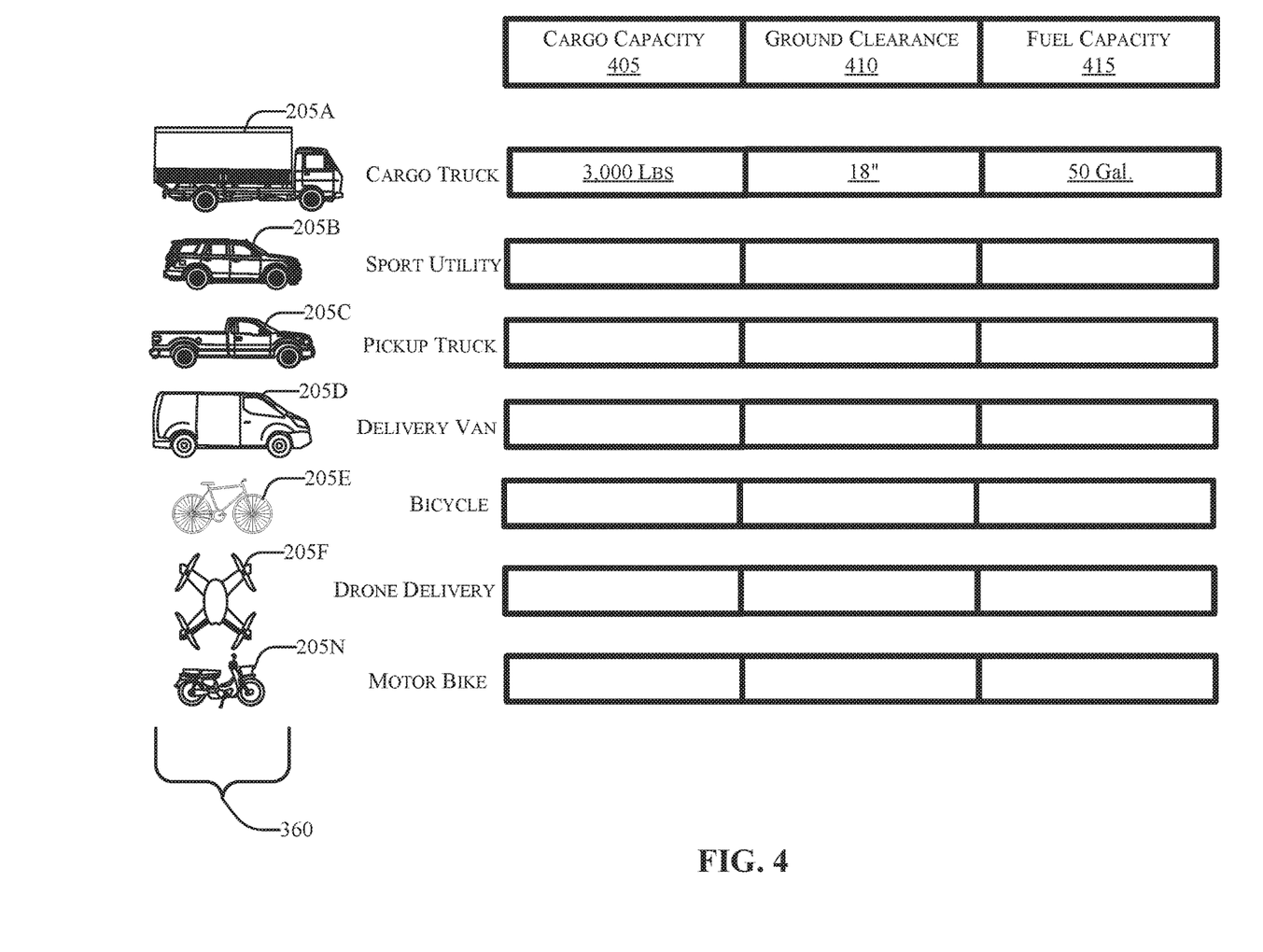
FIG. 4 illustrates an exemplary data structure for characteristics of fleet vehicles for use in practicing the embodiments described herein.

FIG. 4 illustrates an exemplary data structure having characteristics of fleet vehicles such as, for example, the vehicle fleet 360 as described in FIG. 3. The fleet vehicles 360 are represented as vehicles 205A-205N, where the designation N indicates that a fleet can have any number of vehicles. Moreover, the vehicle fleet may include a wide variety of mobility solutions that are available based on the various characteristics associated with the vehicles.

In one example embodiment, a first characteristic 405 may describe cargo holding potential, which may be measured in terms of weight, volume, dimension, etc. Accordingly, each of the vehicles 205A-205N may be able to hold various amounts of cargo, which can be represented in a column of data indicative of a cargo capacity 405. A second characteristic may include, as another example, an ability to navigate rough terrain based on ground clearance between the tires and the vehicle frame. Other characteristics are possible, such as a fuel capacity 415. Although three characteristics are shown, it is possible and contemplated that any number of characteristics may be included, such as a passenger carrying capacity, passenger weight capacity, vehicle weight, vehicle turn radius, vehicle top speed, vehicle towing capacity, flying ability, flying speed, flying altitude, and many other possible characteristics.

Another example of a similar data structure to that described in FIG. 4 may include environmental information that includes terrain data having road/terrain characteristics for identified portions of the travel path (or a possible travel path) that the vehicle will traverse en route to the target destination. Specifically, a first characteristic may include a relative grade of a portion of the road/terrain. A second characteristic may include a relative smoothness of the road/terrain surface, which may be described in various ways such as, for example, a variation in surface elevation given a small sample distance, where a larger elevation change in a short distance can indicate a relatively rough road/terrain. In another example, a road/terrain characteristic can include a factor for muddiness of the road/terrain surface, and/or water depth if a body of water must be traversed by the vehicle en route, etc.

In another example data structure, characteristics may be associated with vehicle passenger requirements. For example, a passenger number, a passenger weight, a special mobility need of a particular passenger (e.g. a wheelchair), etc., may be included as possible passenger characteristics.

As explained in prior figures, aspects of the present disclosure include a process for providing a mobility service that delivers package goods, a person, a piece of equipment, etc., via traversing rough terrain to remote destinations may be referred to as a target destination. The navigation control module 257 may collect environmental information using available resources for collecting the information, such as vehicle sensors and the autonomous drone 120.

The navigation control module 257 may identify various characteristics associated with road conditions, off-road conditions, obstructions to vehicular travel, etc. For example, the processor 250 may send a deploy instruction to the autonomous drone 120 via the navigation control module 257, and collect the environmental information for a proposed route from the autonomous drone 120. The environmental information can include at least one terrain characteristic associated with a path to a target destination. The terrain characteristic can include one or more of a road/terrain type, a road/terrain condition, a road surface material, and a count of vehicles on the path. The autonomous drone 120 may be further enabled to send data from the autonomous drone to the navigation control module 257 that includes an image or a video feed of the road or path, such that the video feed can indicate views of the path ahead where the vehicle sensors alone may be unable to determine the appropriate path forward. The environmental information may include weather information indicative of an atmospheric condition associated with a geographic region in which the path to the target destination is located.

Figure 5:
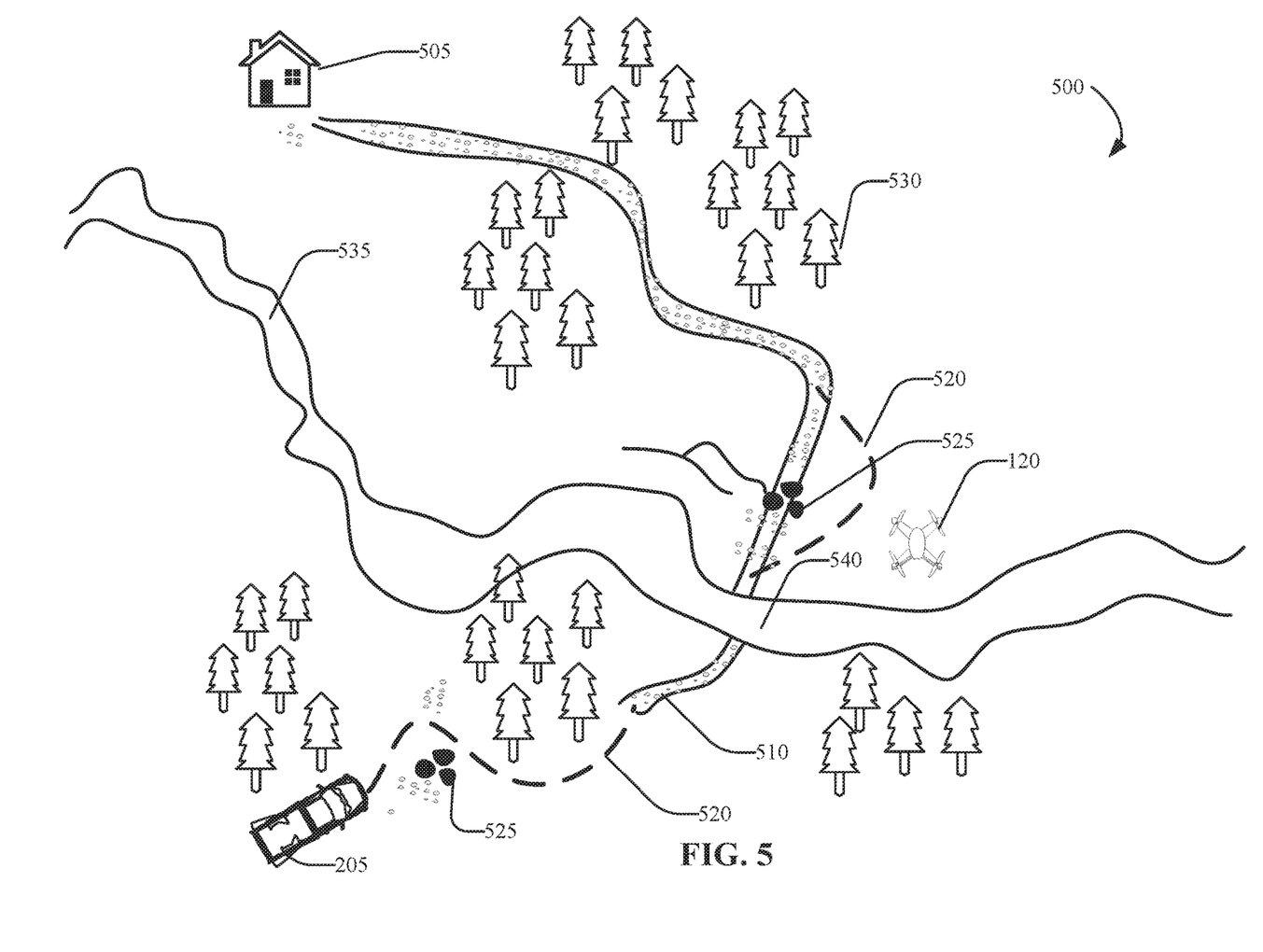
FIG. 5 depicts an example route selection in accordance with the present disclosure.

The navigation control module 257 may be further configured to cause the processor 250 to receive target information indicative of the target destination, and determine a path to the target destination based on a map of a geographic region in which the path to the target destination is located. FIG. 5 depicts a map 500 used in an example route selection showing a target destination 505 in accordance with the present disclosure. The vehicle 205 may be configured to deploy the autonomous drone 120 with a deployment instruction that configures the autonomous drone 120 to survey a path 510 to the target destination 505 with a camera (not shown in FIG. 5) onboard the autonomous drone. In one aspect, the autonomous drone 120 may identify an obstacle 525 on the path and determine an auxiliary path 520 that avoids the obstacle 525 based on the terrain characteristics associated with the path 510 to the target destination 505. The autonomous drone 120 and/or the vehicle 205 may generate navigation coordinates for the auxiliary path 520 that steers the vehicle 205 around the obstacle 525. The vehicle 205 may receive, from the autonomous drone 120, the environmental information that includes terrain data, where the terrain data includes the precise navigation coordinates. The navigation module 257 may cause the vehicle 205 to navigate to the target destination 505 based on the surveyed terrain data. In other aspects, the environmental information can include information including, for example, areas of the path 510 that do not have a viable road and require off-road travel capabilities, areas 540 of the path that may be washed out due to flood waters, a depth or ability to traverse a body of water 535, forest density of a forest 530, etc.

Estimating travel time needed to complete delivery of goods in remote destinations may be challenging due to the unavailability of reliable route data. The system 207 may further include instructions that cause the processor 250 to determine a timing requirement associated with delivering the package or other goods. For example, the processor 250 may determine a payload requirement associated with delivering the package, determine a passenger requirement associated with delivering the package, and/or determine other characteristics of the mobility service to evaluate the suitability of a particular vehicle in the vehicle fleet 360 to perform the delivery service. The processor(s) 250 may determine that the vehicle satisfies the timing requirement, the payload requirement, and the passenger requirement, and select the appropriate vehicle responsive to determining that the vehicle satisfies the specified requirements. Using the specific requirements for the given service, the processor 250 may calculate an estimated travel time associated with a path to a target destination based on the environmental information and the vehicle characteristics and terrain characteristics associated with the environmental information, and calculate the estimated travel time associated with the path to the target destination based on the environmental information and the terrain characteristics learned from the environmental information. The processor 250 may further utilize the at least one vehicle characteristic that describes the vehicle's ability to navigate the terrain based on the environmental information and terrain characteristics, and select the vehicle for the delivery route in accordance with the estimated travel time associated with the target destination based on the at least one characteristic.

Figure 6:
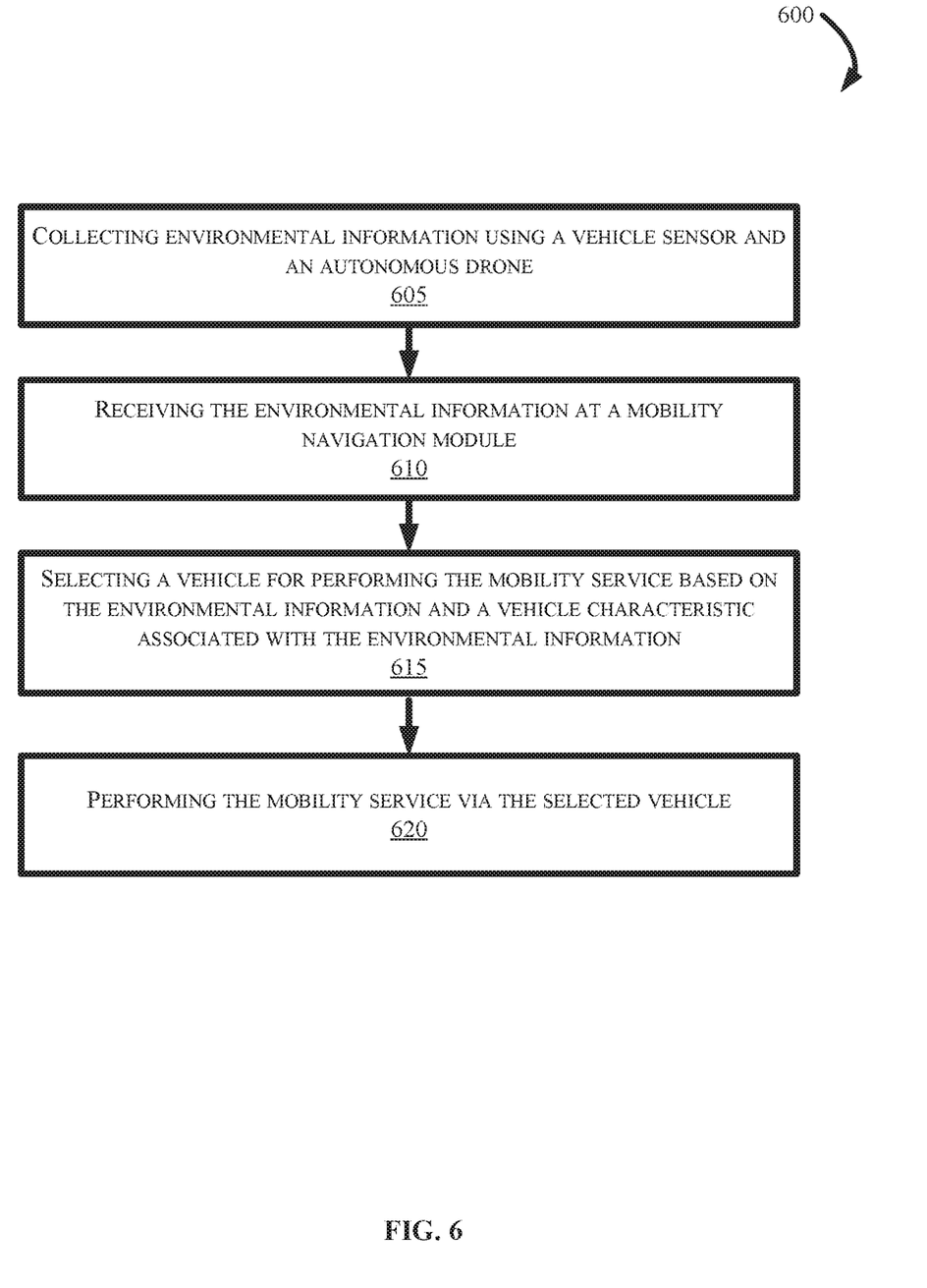
FIG. 6 depicts a flow diagram in accordance with the present disclosure.

FIG. 6 is a flow diagram of an example method 600 for performing a mobility service, according to the present disclosure. FIG. 6 may be described with continued reference to prior figures, including FIGS. 1-5. The following process is exemplary and not confined to the steps described hereafter. Moreover, alternative embodiments may include more or less steps that are shown or described herein, and may include these steps in a different order than the order described in the following example embodiments.

At step 605, the method 600 may commence with collecting environmental information using a vehicle sensor and an autonomous drone. The processor may accomplish this step by sending a deploy instruction to the autonomous drone via a navigation control module, and collecting, via the navigation control module, the terrain data from the autonomous drone. The environmental information may include at least one terrain characteristic associated with a path to a target destination. The terrain characteristic can include one or more of a road type, a road condition, a road surface material, and a count of vehicles on the path. In another aspect, the data from the autonomous drone can further include an image of the path or a video feed of the path, and/or weather information indicative of an atmospheric condition associated with a geographic region in which the path to the target destination is located.

At step 610, the method 600 may further include receiving the environmental information at a mobility navigation module.

At step 615, the method may further include selecting a vehicle for performing the mobility service based on the environmental information, terrain characteristics, and a vehicle characteristic associated with the environmental information. This step may be performed by receiving target information indicative of the target destination, and making several determinations as to an optimal path to that destination. For example, this step can include determining the path to the target destination based on a first map of a geographic region in which the path to the target destination is located, and sending the deployment instruction to the autonomous drone.

The deployment instruction to the autonomous drone configures the autonomous drone for performing several steps, including surveying the path to the target destination with a camera onboard the autonomous drone, identifying an obstacle on the path, and determining an auxiliary path that avoids the obstacle based on the terrain characteristic associated with the path to the target destination and generating navigation coordinates for the auxiliary path.

At step 615, the method may continue with selecting a vehicle for performing the mobility service based on the environmental information and a vehicle characteristic associated with the environmental information and terrain characteristics. Selecting the vehicle can further include receiving, from the autonomous drone, the environmental information, where the environmental information includes the navigation coordinates, and navigating to the target destination based on the environmental information.

In some aspects, the environmental information may further be crowdsourced from other vehicles in the vehicle fleet. For example, obtaining the environmental information can include collecting the environmental information from one or more third vehicles of a vehicle fleet.

In other aspects, selecting the vehicle for performing the mobility service may further include considering time requirements associated with providing the service. For example, selecting the vehicle may include determining a timing requirement associated with providing the mobility service, determining a payload requirement associated with providing the mobility service, determining a passenger requirement associated with providing the mobility service, determining that the vehicle satisfies the timing requirement, the payload requirement, and the passenger requirement, and selecting the vehicle responsive to determining that the vehicle satisfies the timing requirement, the payload requirement, and the passenger requirement.

In other aspects, considering the time requirements may further include steps such as calculating an estimated travel time associated with a path to a target destination based on the environmental information and the vehicle characteristics associated with the environmental information, calculating the estimated travel time associated with the path to the target destination based on the environmental information and a vehicle characteristic, and selecting the vehicle in accordance with the estimated travel time associated with the target destination based on the vehicle characteristic.

The vehicle is selected based on characteristics of the vehicle that may provide some indication as to whether the vehicle is suited or not suited for travel across various terrain features. For example, the terrain navigation characteristics can include a vehicle ground clearance, a tire size, a tire type, a drivetrain type, a vehicle weight capacity, a vehicle fuel or power capacity, and a rate of fuel or power consumption. In other example embodiments, the vehicle may be a flying vehicle or a water navigable vehicle. Accordingly, the vehicle characteristic(s) can include the vehicle's ability to fly, and ability to traverse a body of water.

At step 620, the method may include performing the mobility service using the vehicle based on the environmental information and the vehicle characteristics. For example, the method may include selecting the vehicle based on the environmental information, selecting the route based on the vehicle characteristics, terrain data that includes terrain characteristic information, and other trip-specific information, and deploying the vehicle and an autonomous drone to accompany the vehicle in providing the mobility service.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for performing a mobility service using a vehicle, comprising:
   determining a request to perform a mobility service associated with a target destination;
   sending a deployment instruction to an autonomous drone:
   receiving terrain data and environmental information from the autonomous drone, the terrain data comprising at least one terrain characteristic associated with a path to the target destination, the terrain characteristic comprising one or more of a road type, a road condition, or a road surface material;
   selecting the vehicle for performing the mobility service based on the terrain data received from the autonomous drone and a vehicle characteristic associated with the vehicle;
   determining a road associated with the path to the target destination based on a map of a geographic region in which the path to the target destination is located;
   receiving, from the autonomous drone, navigational coordinates associated with an auxiliary path around the road, wherein the auxiliary path is an off-road path separate from the road, wherein the auxiliary path is generated by the autonomous drone based on a determination that the vehicle is able to navigate a type of off-road terrain associated with the auxiliary path, and wherein the auxiliary path avoids an obstacle at a first location on the road; and
   navigating to the target destination using the road and the auxiliary path at the first location on the road
   wherein selecting the vehicle comprises:
   determining a timing requirement associated with providing the mobility service;

determining a payload requirement associated with providing the mobility service;

determining a passenger requirement associated with providing the mobility service;

determining that the vehicle satisfies the timing requirement, the payload requirement, and the passenger requirement;

and optimizing the vehicle based on a fuel consumption characteristic, a fuel capacity, and availability of another vehicle in a vehicle fleet responsive to determining that the vehicle satisfies the timing requirement, the payload requirement, and the passenger requirement.

2. The method according to claim 1, further comprising receiving information from any one or more of a vehicle sensor and an online environmental data source.

3. The method according to claim 1, wherein terrain data from the autonomous drone further comprises an image of the path or a video feed of the path.

4. The method according to claim 1, wherein the environmental information further comprises weather information indicative of an atmospheric condition associated with a geographic region in which the path to the target destination is located.

5. The method according to claim 1, wherein the environmental information is received from one or more third vehicles of a vehicle fleet.

6. The method according to claim 1, further comprising selecting the vehicle responsive to determining that the vehicle satisfies a fuel consumption requirement associated with providing the mobility service.

7. The method according to claim 1, further comprising: calculating an estimated travel time associated with a path to the target destination based on the environmental information and the vehicle characteristic associated with the environmental information; calculating the estimated travel time associated with the path to the target destination based on the environmental information and the vehicle characteristic; and selecting the vehicle based on the estimated travel time associated with the target destination based on the vehicle characteristic.

8. The method according to claim 1, wherein the vehicle characteristic comprises a set of terrain navigation characteristics comprising a vehicle ground clearance, a tire size, a tire type, a drivetrain type, a vehicle weight capacity, a vehicle fuel or power capacity, and a rate of fuel or power consumption.

9. The method according to claim 1, wherein the vehicle characteristic comprises one of a set of maneuverability characteristics comprising ability to fly, and ability to traverse a body of water.

10. A system, comprising:
an autonomous drone;
a processor disposed in communication with the autonomous drone; and
a memory for storing executable instructions, the processor configured to execute instructions to:
determine a request to perform a mobility service associated with a target destination;
send a deployment instruction to an autonomous drone:
receive terrain data and environmental information from the autonomous drone, the terrain data comprising at least one terrain characteristic associated with a path to the target destination, the terrain characteristic comprising one or more of a road type, a road condition, a road surface material, or a count of vehicles on the path;

select the vehicle for performing the mobility service based on the terrain data received from the autonomous drone and a vehicle characteristic associated with the vehicle;

determine a road associated with the path to the target destination based on a map of a geographic region in which the path to the target destination is located;

receive, from the autonomous drone, navigational coordinates associated with an auxiliary path around the road, wherein the auxiliary path is an off-road path separate from the road, wherein the auxiliary path is generated by the autonomous drone based on a determination that the vehicle is able to navigate a type of off-road terrain associated with the auxiliary path, and wherein the auxiliary path avoids an obstacle at a first location on the road; and navigate to the target destination using the road and the auxiliary path at the first location on the road wherein select the vehicle comprises:
determine a timing requirement associated with providing the mobility service;
determine a payload requirement associated with providing the mobility service;
determine a passenger requirement associated with providing the mobility service;
determine that the vehicle satisfies the timing requirement, the payload requirement, and the passenger requirement;
and optimize the vehicle based on a fuel consumption characteristic, a fuel capacity, and availability of another vehicle in a vehicle fleet responsive to determine that the vehicle satisfies the timing requirement, the payload requirement, and the passenger requirement.

11. The system according to claim 10, wherein the processor is further configured to execute the instructions to receive information from any one or more of a vehicle sensor and an online environmental data source.

12. The system according to claim 10, wherein terrain data from the autonomous drone further comprises an image of the path or a video feed of the path.

13. The system according to claim 10, wherein the environmental information further comprises weather information indicative of an atmospheric condition associated with a geographic region in which the path to the target destination is located.

14. The system according to claim 10, wherein the processor is further configured to execute the instructions to: receive the environmental information from one or more third vehicles of a vehicle fleet.

15. A non-transitory computer-readable storage medium in a mobility navigation module for a vehicle, the computer-readable storage medium having instructions stored thereupon which, when executed by a processor, cause the processor to:
determine a request to perform a mobility service associated with a target destination;
send a deployment instruction to an autonomous drone:
receive terrain data and environmental information from the autonomous drone, the terrain data comprising at least one terrain characteristic associated with a path to the target destination, the terrain characteristic comprising one or more of a road type, a road condition, a road surface material, or a count of vehicles on the path;

select the vehicle for performing the mobility service based on the terrain data received from the autonomous drone and a vehicle characteristic associated with the vehicle;

determine a road associated with the path to the target destination based on a map of a geographic region in which the path to the target destination is located;

receive, from the autonomous drone, navigational coordinates associated with an auxiliary path around the road, wherein the auxiliary path is an off-road path separate from the road, wherein the auxiliary path is generated by the autonomous drone based on a determination that the vehicle is able to navigate a type of off-road terrain associated with the auxiliary path, and wherein the auxiliary path avoids an obstacle at a first location on the road; and navigate to the target destination using the road and the auxiliary path at the first location on the road wherein select the vehicle comprises:

determine a timing requirement associated with providing the mobility service;

determine a payload requirement associated with providing the mobility service;

determine a passenger requirement associated with providing the mobility service;

determine that the vehicle satisfies the timing requirement, the payload requirement, and the passenger requirement;

and optimize the vehicle based on a fuel consumption characteristic, a fuel capacity, and availability of another vehicle in a vehicle fleet responsive to determining that the vehicle satisfies the timing requirement, the payload requirement, and the passenger requirement.

16. The method of claim 1, further comprising: determining a physical adjustment to the vehicle based on the terrain data, wherein the physical adjustment to the vehicle comprises engaging drivetrain axels for 4-wheel drive.

17. The system of claim 10, wherein the processor is further configured to execute the instructions to determine a physical adjustment to the vehicle based on the terrain data, wherein the physical adjustment to the vehicle comprises engaging driving axels for 4-wheel drive.

* * * * *